United States Patent [19]

Karns et al.

[11] Patent Number: 4,506,597
[45] Date of Patent: Mar. 26, 1985

[54] DRIP COFFEE MAKING KIT

[76] Inventors: Albert L. Karns, 2218 Brownell; Robert M. Jennings, 1907 E. 20th, Box 2095, both of Joplin, Mo. 64801

[21] Appl. No.: 547,651

[22] Filed: Oct. 31, 1983

[51] Int. Cl.³ ............................................. A47J 31/10
[52] U.S. Cl. ..................................................... 99/295
[58] Field of Search ................ 99/280, 281, 295, 304, 99/305, 306, 344, 316, 279, 282, 283, 284, 290, 291; 426/433

[56] References Cited

U.S. PATENT DOCUMENTS

| 359,292 | 3/1887 | Taylor | 99/305 |
|---|---|---|---|
| 1,813,646 | 7/1931 | Turkenton | 99/305 |
| 2,192,600 | 3/1940 | Lurtz | 99/344 X |
| 3,413,909 | 12/1968 | Heier | 99/295 X |
| 3,552,298 | 1/1971 | Bufkin | 99/281 |
| 3,693,535 | 9/1972 | Abel Jr. | 99/305 X |
| 3,853,043 | 12/1974 | Stavropoulis | 99/306 |

FOREIGN PATENT DOCUMENTS 592084  1/1934  Fed. Rep. of Germany ........ 99/306

Primary Examiner—Robert W. Jenkins
Attorney, Agent, or Firm—Harvey B. Jacobson; Clarence A. O'Brien

[57] ABSTRACT

Upper and lower downwardly and upwardly opening caps are provided and removably telescopingly engageable over the upper and lower ends of an upstanding tubular body. The body includes a mid-height partition having a central drain opening therein and electrical resistance heating structure as disposed within the body for heating liquid therein above the partition. Valve structure is provided for opening and closing the drain opening and one side portion of the body below the partition has an access opening therein. An upwardly opening filter basket is provided and insertable inwardly of and withdrawable outwardly through the access opening and the body and basket include coacting structure removably supporting the basket within the body below the partition and in registry with the drain opening. The body and lower cap are of non-circular plan shape, whereby the lower end of the body may be turned and supported from the upper open end of the lower cap for drainage of liquids from the filter basket into the lower cap.

10 Claims, 10 Drawing Figures

DRIP COFFEE MAKING KIT

BACKGROUND OF THE INVENTION

Various different forms of coffee makers heretofore have been provided for making multiple cups of coffee, but few have been specifically designed for use by a traveller and constructed in a manner whereby a traveller may quickly make one or two cups of coffee through the utilization of a coffee maker which may be stored in a compact state. Accordingly, a need exists for a small compact coffee maker which may be used by a traveller for the purpose of making one or two cups of coffee and yet which may be readily packed and transported in a compact state.

Examples of various different forms of coffee makers including some of the general structural and operational features of the instant invention are disclosed in U.S. Pat. Nos. 2,624,451, 2,641,991, 2,682,601, 3,268,104, 4,155,929 and 4,205,598. However, these previously known forms of coffee makers and similar devices are not specifically designed with the traveller in mind for rapid use and ready compact packing and transport.

BRIEF DESCRIPTION OF THE INVENTION

The drip coffee making kit of the instant invention includes a tubular body which is substantially square in cross-sectional shape and has a mid-height partition therein provided with a central drain opening. Water to be used in making coffee is poured into the upper portion of the tubular body above the partition and the valve structure is provided for selectively opening and closing the drain opening. One side of the lower portion of the tubular body is provided with an access opening through which a filter basket may be inserted into the lower portion of the tubular body in registry with the drain opening and the upper and lower ends of the body are provided with removable caps telescopingly engaged thereover.

During use of the coffee making kit, both of the caps are removed and the lower cap, which also serves as a coffee receptacle, is placed in an upwardly opening position with the lower end of the tubular body rotated 45° relative thereto and supported from the upper marginal edges of the lower cap. Electrical resistance heating structure is provided and operatively associated with the partition for heating water disposed thereabove and an alarm circuit is operatively associated with the electrical resistance heating structure and renders an audible alarm when the electrical resistance heating structure has been actuated a sufficient length of time to properly heat the water within the body above the partition. When the alarm is actuated, the user of the coffee making kit opens the valve to the drain opening and allows the heated water to fall downward into the filter basket for subsequent drainage therefrom into the lower cap. After the full amount of water within the tubular body has drained into the lower cap, the electrical resistance heating means may be deactivated and the prepared coffee within the upwardly opening lower cap may be poured into one or more cups which are provided and may be stored in nested relation within the upper portion of the tubular body below the top cap telescopingly engaged thereover.

The main object of this invention is to provide a coffee making kit of extremely compact design and which therefore may be used by a traveller without the coffee making kit occupying excessive room in luggage.

Another object of this invention is to provide a coffee making kit which will be capable of making more than one cup of coffee and which includes electrical resistance heating means for heating the water to be used in making coffee from a conventional source of electrical potential.

Yet another object of this invention is to provide a coffee making kit including a control circuit for the electrical resistance heating means provided and wherein the control circuit includes an alarm which will automatically render an audible signal when the electrical resistance heating means has been actuated for a duration of time sufficient to heat the water placed in the water receiving compartment of the kit for the purpose of making coffee.

Yet another important object of this invention is to provide a coffee making kit including an extension cord therefor for operative connection with a suitable source of electrical potential such as a domestic electrical system and wherein the kit includes a compartment in which the extension cord may be stored when the kit is not in use.

A final object of this invention to be specifically enumerated herein is to provide a coffee making kit in accordance with the preceding objects and which will conform to convention forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 10 is a diagrammatic view of the wiring circuit for the coffee making kit.

DETAILED DESCRIPTION OF THE INVENTION

Figure 1:
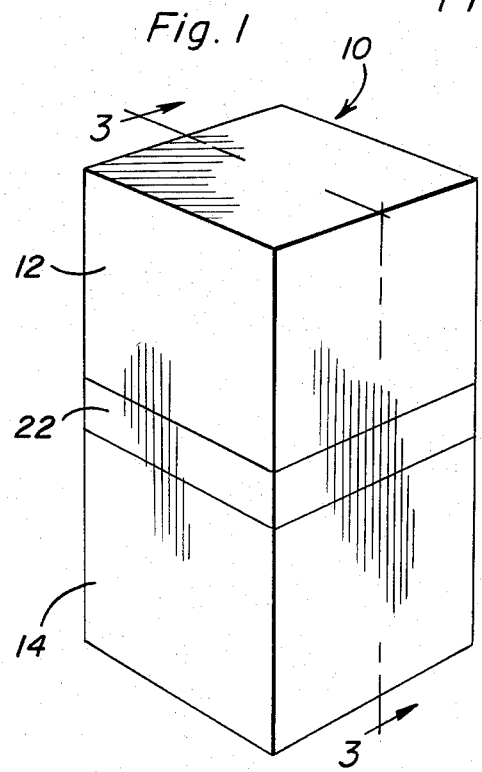
FIG. 1 is a perspective view of the coffee making kit of the instant invention in a fully closed position.

Referring now more specifically to the drawings, the numeral 10 generally designates the drip coffee making kit of the instant invention. The kit 10 includes upper and lower downwardly and upwardly caps 12 and 14 and an upstanding tubular body 16 including an upper portion 18 and a lower portion 20. The upper portion 18 includes a lower end outwardly offset wall portion 22 extending peripherally thereabout defining a lower end peripheral band and the upper extremity of the band 22 defines an external upwardly facing shoulder 24 while the interior of the band 22 defines an inner peripheral shoulder 25 recessed inwardly of the lower end of the upper portion 18.

Figure 3:
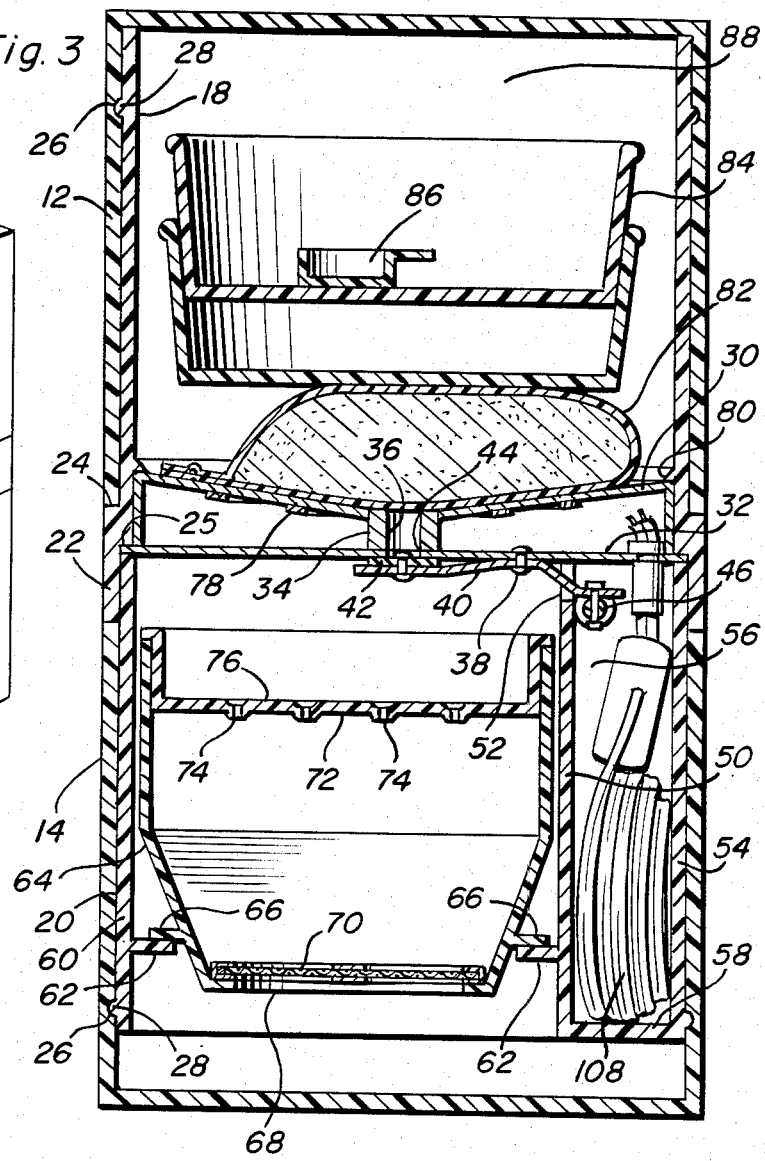
FIG. 3 is an enlarged vertical sectional view taken substantially upon the plane indicated by the section line 3—3 of FIG. 1.

From FIGS. 1 and 3 of the drawings, it may be seen that the upper and lower caps 12 and 14 may be telescoped downwardly and upwardly over the upper and lower portions 18 and 20 of the tubular body 16 and that the upper cap 12 and upper portion 18 include coacting detent recesses and projections 26 and 28 whereby the upper cap 12 may be snap fittingly retained on the upper portion 18. Further, the lower cap 14 and lower portion 20 include similar recesses and projection 26 and 28. Also, from FIG. 1 it will be noted that the band 22 includes outer surfaces which are coextensive with the corresponding outer surfaces of the upper and lower caps 12 and 14 and that the kit 10 therefore includes a smooth exterior.

The lower portion 20 is snugly telescoped within the band 22 during assembly and thermo-welded, sonic-welded or otherwise permanently anchored to the upper portion 18 after upper and lower transverse partitions 30 and 32 are inserted within the lower end of the upper portion 18 to the positions thereof illustrated in FIG. 3.

The upper partition 30 defines a shallow upwardly opening conical partition including a central downwardly projecting tubular outlet neck 34 defining an outlet opening 36 extending therethrough and the lower partition 32 oscillatably supports, by a pivot fastener 38, a spring leaf valve lever 40 having a resilient washer 42 supported from one free end thereof swingable into and out of registry with an opening 44 formed in the lower partition 32 and registered with the lower end of the outlet neck 34. The other end of the valve lever 40 has the inner rear end of a front-to-rear extending operating lever 46 pivotally attached thereto and the forward outer end of the operating lever 46 extends forward to the open front side 48 of the lower portion 20.

The lower portion 20 includes an upstanding front-to-rear extending partition 50 having an upper window therein through which the end of the lever 40 remote from the washer 42 extends and the partition 50 is disposed closely adjacent but spaced inward from the right sidewall 54 of the lower portion 20 to define a narrow upstanding storage compartment 56 between the wall 54 and the partition 50, the compartment 56 including a bottom wall 58 extending between the lower ends of the partition 50 and the wall 54.

The inner sides of the partition 50 and the wall 60 of the lower portion 20 opposite the partition 50 include inwarding projecting front-to-rear extending horizontal support flanges 62 and a filter basket 64 is provided and includes opposite side outwardly projecting front-to-rear extending flanges 66 which slidingly engage, overlie and are supported from the flanges 62 for support of the filter basket 64 from the flanges 60, the filter basket 64 being removable through the open front side 48 of the lower portion 20.

The filter basket 64 includes an annular bottom wall 68 which supports a replaceable filter element 70 and the interior of the upper portion of the filter basket 64 includes a removable upwardly opening water dispersion tray 72 having a plurality of small drain openings 74 formed through the bottom wall 76 of the tray 72.

An electrical resistance heating element coil 78 underlies the partition 30 in good heat transfer relation therewith and the partition 30 may be constructed of a metallic material having good heat conducting and corrosion resistant properties. The partition 30 is tightly sealed within the lower end of the upper portion 18 immediately beneath an inwardly projecting peripherally extending lip 80 formed integrally with the upper portion 18 and a suitable "Zip-Lock" packet 82 of coffee, a pair of drinking cups 84 and a coffee measuring cup 86 may be supported within the upper chamber 88 of the kit 10 defined within the upper portion 18 above the partition 30.

With attention now invited more specifically to FIG. 10, it may be seen that the coil 78 is electrically connected in a loop circuit 92 having a load resistor in the form of a thermistor 94 serially connected herein. In addition, a loop bypass circuit 96 is electrically connected to the circuit 92 as at 98 and 100 and bypasses the thermistor 94. The circuit 96 includes a diode 102, an electrically actuatable sound emitting alarm 104 and a load resistor 106 serially connected therein. The circuit 92 may be connected to any suitable source of electrical potential such as 110 volt domestic current through an extension cord 108 which may be stored within the compartment 56.

Figure 2:
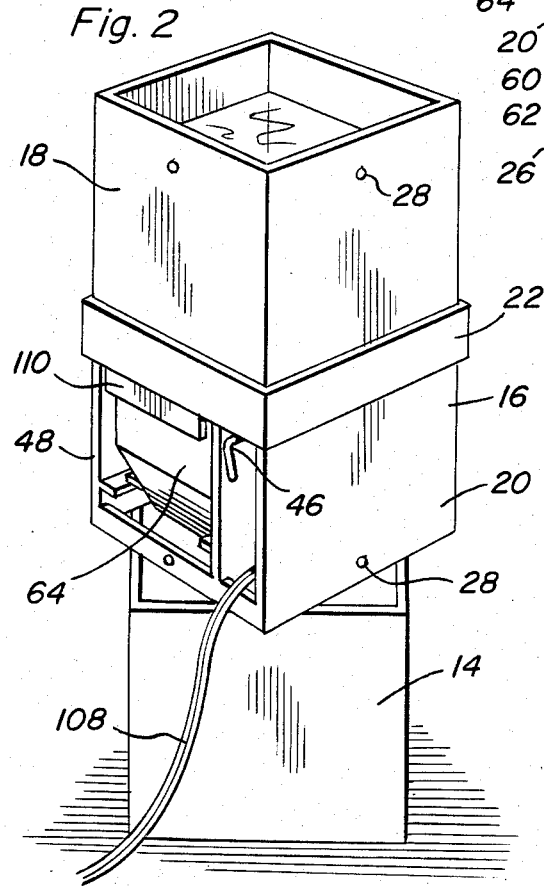
FIG. 2 is a perspective view of the coffee making kit with the upper cap thereof removed and with the tubular body and lower cap of the kit in relative positions for heated water to be used in making coffee to drain through the filter basket and down into the lower cap of the kit which is illustrated in a position rotated 45° relative to the tubular body of the kit.
Figure 4:
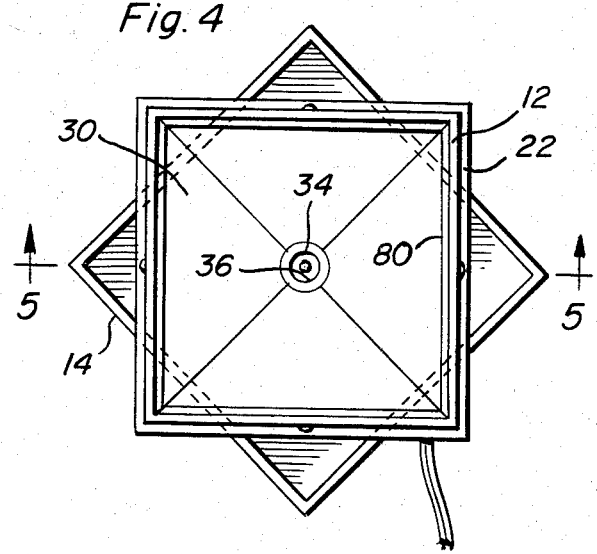
FIG. 4 is an enlarged top plan view of the assemblage illustrated in FIG. 2.
Figure 5:
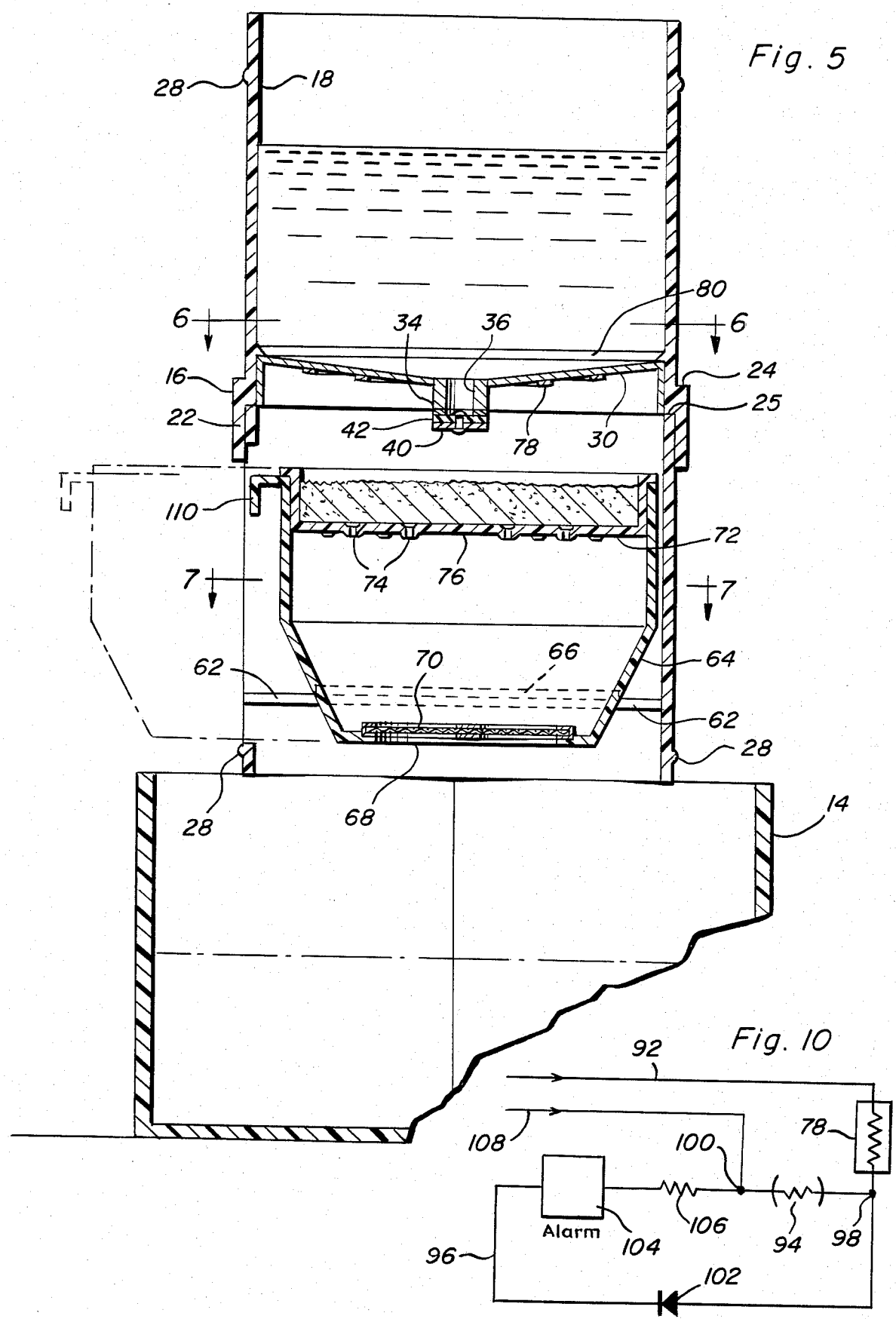
FIG. 5 is a further enlarged fragmentary vertical sectional view taken substantially upon the plane indicated by the section line 5—5 of FIG. 4.
Figure 6:
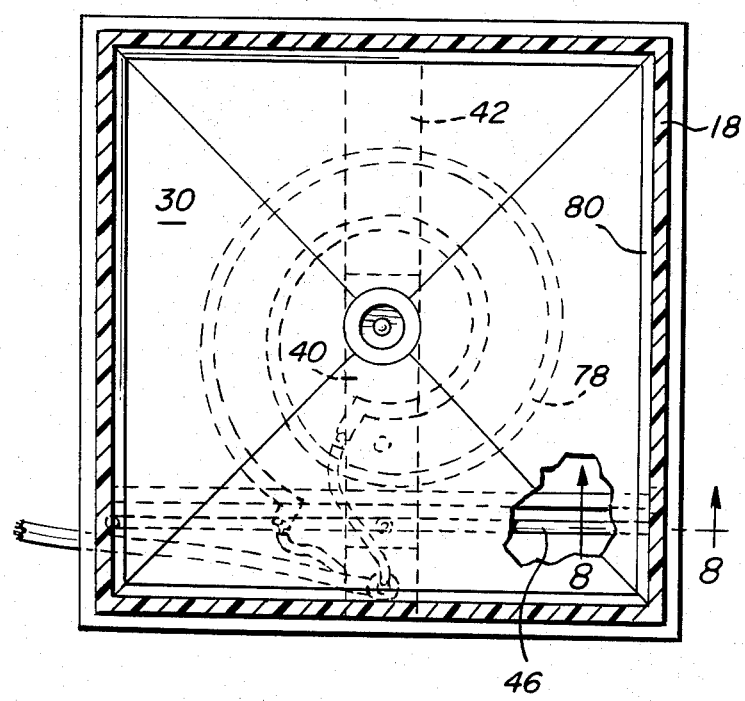
FIG. 6 is a horizontal sectional view taken substantially upon the plane indicated by the section line 6—6 of FIG. 5.
Figure 8:
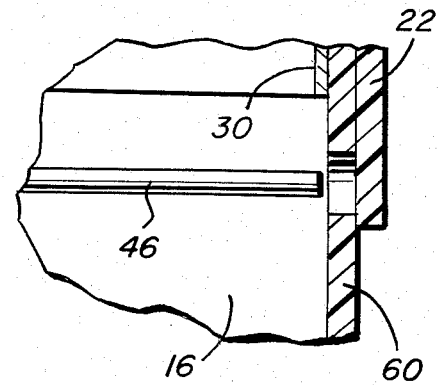
FIG. 8 is an enlarged fragmentary vertical sectional view taken substactially upon the plane indicated by the section line 8—8 of FIG. 6.
Figure 9:
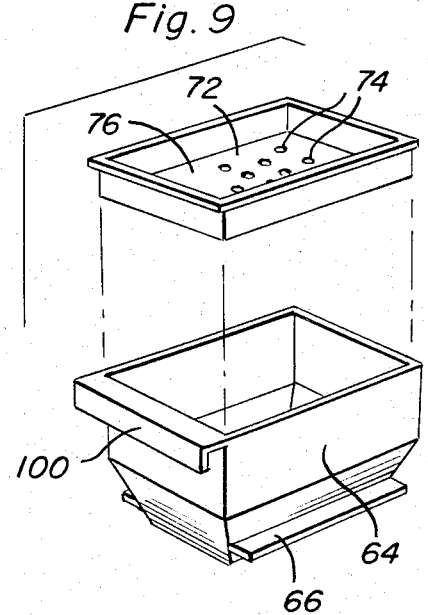
FIG. 9 is an exploded perspective view of the filter basket of the coffee making kit.
Figure 7:
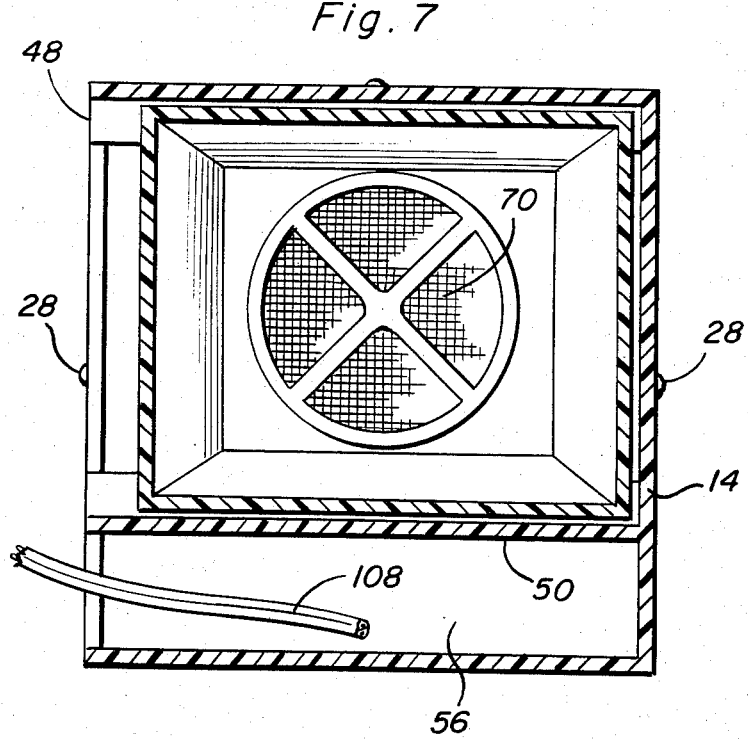
FIG. 7 is a horizontal sectional view taken substantially upon the plane indicated by the section line 7—7 of FIG. 5.

In operation, assuming that all of the components of the kit 10 are in the positions thereof as illustrated in FIG. 3, the upper and lower caps 12 and 14 may be removed and the tubular body 16 may be rotated approximately 45° relative to the lower cap 14 and positioned thereon in the manner illustrated in FIG. 2, the caps 12 and 14 as well as the tubular body 16 being substantially square in plan shape. Thereafter, the cups 84 and 86 as well as the packet 82 may be removed from within the upper portion 18 of the tubular body 16 and the packet 82 may be opened and the desired amount of coffee from therewithin may be measured into the bottom of the filter basket 64 over the filter element 70 by the measuring spoon or cup 86. Thereafter, the tray 72 is replaced on the top of the basket 64 and the latter is reinserted through the open side 48 of the lower portion 20 of the tubular body 16. Thereafter, the desired quantity of cool water may be placed within the upper portion 18 and above the partition 30 while the valve assembly 40, 42 remains closed. Thereafter, the extension cord 108 may be electrically connected to the aforementioned suitable source of electrical potential and the heating coil 78 will be actuated. When the thermister is heated to approximately 190° F.-200° F., it will substantially open and cause the current supplied to the circuit 92 to pass through the circuit 96 to actuate the sound alarm 104. At this point, the operating lever 46 may be actuated to swing the valve lever 40 to the open position and allow the heated water within the upper portion 18 above the partition 30 to flow downward into the tray 72 for dispersion thereby and subsequent passage through an opening 74 and the coffee disposed on the filter element 70. Of course, the coffee being prepared will drain from the filter basket 64 into the lower cap 14 from which it may be subsequently poured into one or both of the cups 84.

The filter basket 64 includes an upper handgrip 110 on its front side which may be manually engaged through the open front side 48 of the lower portion 20 of the tubular body 16 and the filter basket 64 may be provided with disposable paper filters, if desired.

The caps and 11 and 14, the tubular body 16, the filter basket 64 and the cups 84 and 86 may be constructed of suitable plastic material as may the tray 72. However, the partitions 30 and 32 probably will be constructed of suitable metal.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A drip coffee making kit including upper and lower downwardly and upwardly opening closure caps and an upstanding tubular body over whose upper and lower ends said upper and lower closure caps are removably snugly telescoped and releasably secured to provide a unitary, closed and readily portable assembly, said body including a mid-height partition having a a central opening therein, electrical resistance heating means in said body for heating liquid disposed therein above said partition, valve means for opening and closing said drain opening, one side of the body below said partition having an access opening therein, an upwardly opening filter basket, said filter basket being receivable inwardly and outwardly through said opening and said body and basket including coacting means for removably supporting the basket within said body below said partition and in registry with said drain opening, and said body and lower cap being of a non-circular plan shape, whereby the lower end of said body and said lower cap may be relatively angularly displaced after separation of said lower cap from the lower end of said body for support of the body lower end from the upper open end of said lower cap and drainage of liquids from said basket into said lower cap.

2. The coffee making kit of claim 1 wherein said caps and body are polygonal in plan shape.

3. The coffee making kit of claim 1 wherein said partition includes at least a central portion thereof constructed of good heat transfer material, said electrical resistance heating means including a heating coil supported from the underside of said partition central portion in good heat transfer relation therewith.

4. The coffee making kit of claim 1 wherein said body includes an upstanding partition therein disposed to one side of said basket defining a storage compartment between said partition in the corresponding side of said body, said compartment also opening outwardly of said access opening, and an extension cord removably stored within said compartment and electrically connected to said electrical resistance heating means.

5. The coffee making kit of claim 1 wherein said body includes an outwardly projecting peripheral band intermediate the upper and lower ends thereof, the lower and upper ends of said upper and lower caps being downwardly and upwardly abutted against the upper and lower portions of said band.

6. The coffee making kit of claim 5 wherein said partition includes at least a central portion thereof constructed of good heat transfer material, said electrical resistance heating means including a heating coil supported from the underside of said partition central portion in good heat transfer relation therewith.

7. The coffee making kit of claim 1 wherein said caps and body are parallelepiped in plane shape.

8. The coffee making kit of claim 7 wherein said body includes an upstanding partition therein disposed to one side of said basket defining a storage compartment between said partition in the corresponding side of said body, said compartment also opening outwardly of said access opening, and an extension cord removably stored within said compartment and electrically connected to said electrical resistance heating means.

9. The coffee making kit of claim 1 including at least one drinking cup removably receivable within the upper portion of said body above said partition.

10. The coffee making kit of claim 1 wherein said valve means includes an operator therefor manually engageable through said access opening.

* * * * *